B. G. KODJBANOFF.
PHOSPHORESCENT SIGN.
APPLICATION FILED JUNE 29, 1907.
899,873.  Patented Sept. 29, 1908.
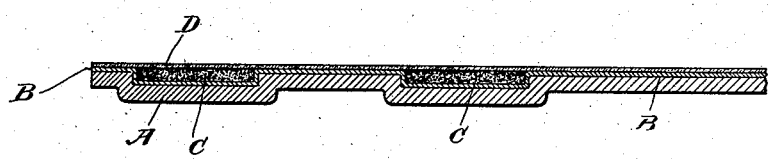

UNITED STATES PATENT OFFICE.

BASIL G. KODJBANOFF, OF NEW YORK, N. Y.

PHOSPHORESCENT SIGN.

No. 899,873.  Specification of Letters Patent.  Patented Sept. 29, 1908.

Application filed June 29, 1907. Serial No. 381,560.

*To all whom it may concern:*

Be it known that I, BASIL G. KODJBANOFF, of New York city, in the county of New York, and in the State of New York, have invented a certain new and useful Improvement in Phosphorescent Signs, and do hereby declare that the following is a full, clear, and exact description thereof, reference being had to the accompanying drawing, in which—

Figure 1 is a plan view of the sign embodying my invention and Fig. 2 is a section of Fig. 1.

The object of my invention has been to provide a phosphorescent sign of great durability, and of attractive appearance, and to such ends my invention consists in the phosphorescent sign hereinafter specified.

In making a sign according to my invention, sunken letters are formed preferably in an enameled surface: the drawing illustrates one manner in which such sunken letters may be formed. In the drawing there is a plate of metal A having impressed in its surface the letters of the sign. The plate is then coated with a coating of enamel B, which is preferably a porcelain enamel. The enamel while covering the metal, still forms sunken letters corresponding to those in the metal. The sunken letters are then partly or wholly filled with a phosphorescent preparation C. The preparation which I prefer to use is commercial phosphorus, rendered more plastic by the addition of a small percentage of barium. Any desired pigment may also be added to the mixture. The phosphorus mixture is preferably applied in a cold condition. Finally, a coating D of glass is spread over the entire face of the sign in a plastic condition covering both the enamel and the phosphorus mixture. I prefer to heat only the glass and to heat that only to a temperature sufficient to enable it to adhere to the porcelain. The coating of glass is preferably very thin. It does not injure the phosphorus but, on the other hand, protects it.

I believe I am the first to ever devise an enameled phosphorus sign, and I wish to claim such invention broadly. I also believe I am the first to ever cover a phosphorus sign with glass applied in a plastic condition. I also believe I am the first to ever inclose a phosphorus mixture between a backing of enamel and a facing of glass whereby it is fully protected from the atmosphere. I therefore desire that my claims shall have the broadest interpretation consistent with their terms and the prior art. Signs made according to my invention will be legible both for day and night, and in that respect will be particularly desirable for such uses as license numbers on automobiles.

I claim:—

1. A phosphorescent sign, comprising letters formed of phosphorescent composition, and a glass inclosure for such letters, said glass being welded to seal such composition therein.

2. A phosphorescent sign, consisting of phosphorescent characters, a glass inclosure for said characters and a back, said glass inclosures being sealed to hermetically inclose said characters, and being secured to said back.

3. A phosphorescent sign, comprising a base, a coating of enamel on said base, a coating of glass covering the said enamel and welded thereto, said glass and enamel being separated at points removed from their edges to form character-shaped spaces, and characters formed of phosphorescent composition inclosed in said spaces.

4. A phosphorescent sign, comprising a base having character - shaped depressions formed therein, a coating of enamel on said base, characters of phosphorescent composition occupying said depressions, and a coating of glass covering said characters and welded to said enamel.

In testimony that I claim the foregoing I have hereunto set my hand.

BASIL G. KODJBANOFF.

Witnesses:
EDWIN J. PRINDLE,
ISABEL PEARSE.